United States Patent [19]
Schmidt, Jr.

[11] 3,708,072
[45] Jan. 2, 1973

[54] METHOD AND APPARATUS FOR CONTROLLING FILTER CAKE THICKNESS AND FOR COMPRESSING A FILTER CAKE

[75] Inventor: Henry Schmidt, Jr., Hinsdale, Ill.

[73] Assignee: Industrial Filter & Pump Mfg. Co., Cicero, Ill.

[22] Filed: Oct. 13, 1970

[21] Appl. No.: 80,270

[52] U.S. Cl....................................210/332, 210/350
[51] Int. Cl........................B01d 35/20, B01d 25/38
[58] Field of Search......210/332, 334, 350, 351, 356, 210/357

[56] References Cited

UNITED STATES PATENTS

| | | | |
|---|---|---|---|
| 3,017,996 | 1/1962 | Riley | 210/351 X |
| 3,499,535 | 3/1970 | Zievers et al. | 210/332 |

Primary Examiner—Frank A. Spear, Jr.
Attorney—Fidler, Patnaude, Lazo & Batz

[57] ABSTRACT

A filter cake deposited on a porous surface is compressed thereagainst by a flexible sheet mounted adjacent the porous surface on the upstream side thereof so that when the filter cake builds up against the sheet it is forced by the hydraulic pressure of the liquid being filtered toward the cake to thereby automatically compress the cake when it becomes sufficiently thick to reach the sheet.

19 Claims, 9 Drawing Figures

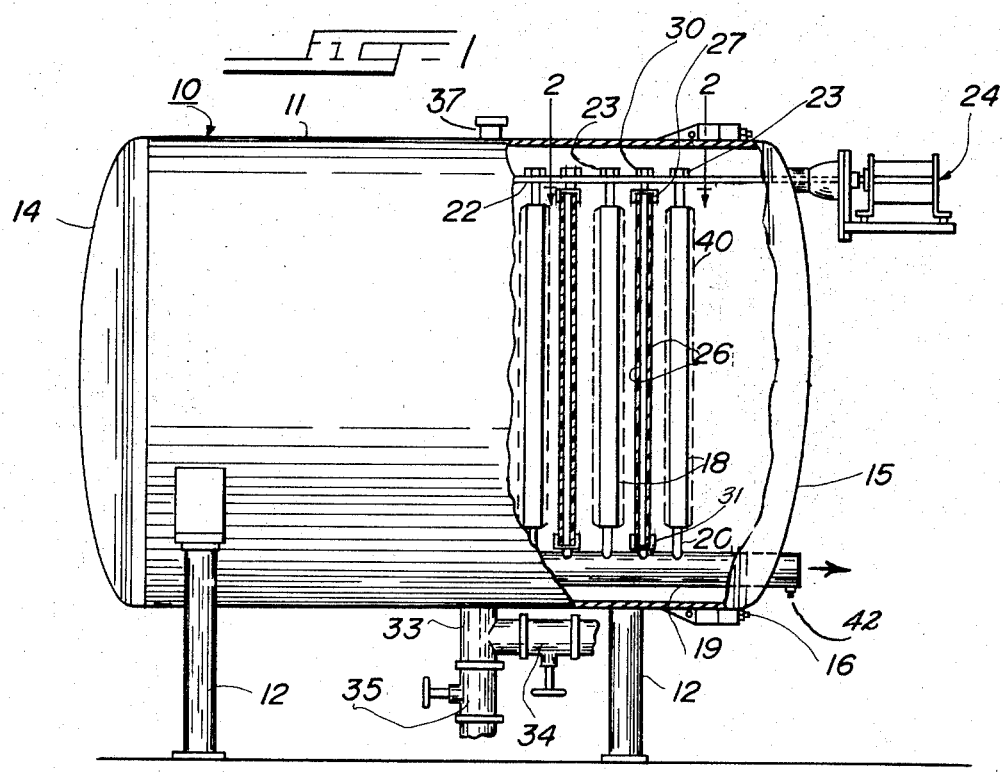
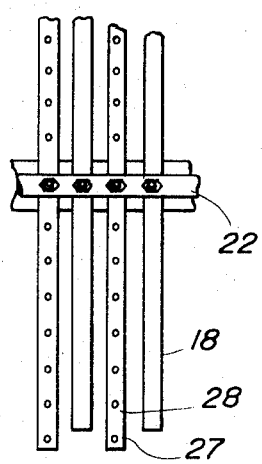
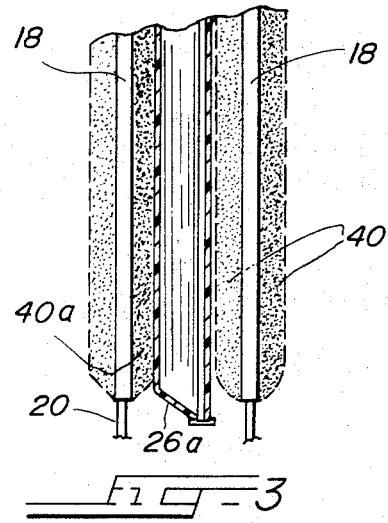
INVENTOR.
HENRY SCHMIDT, JR

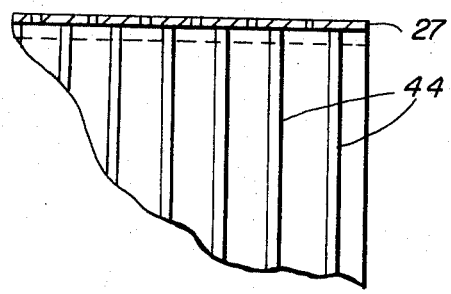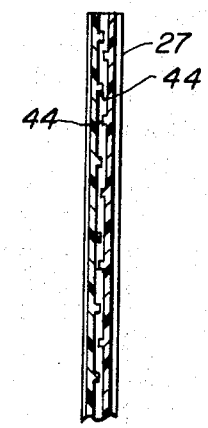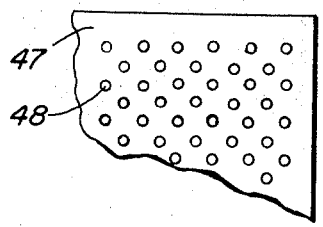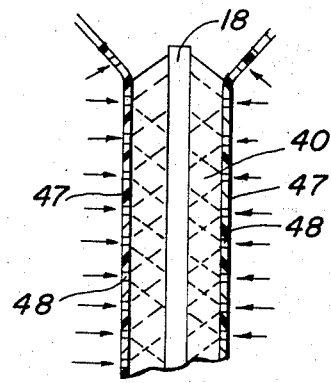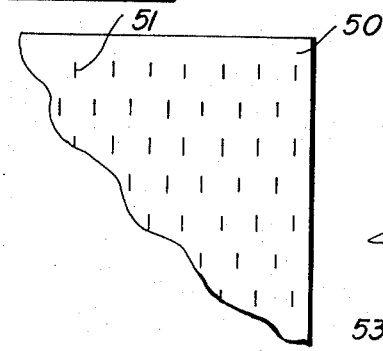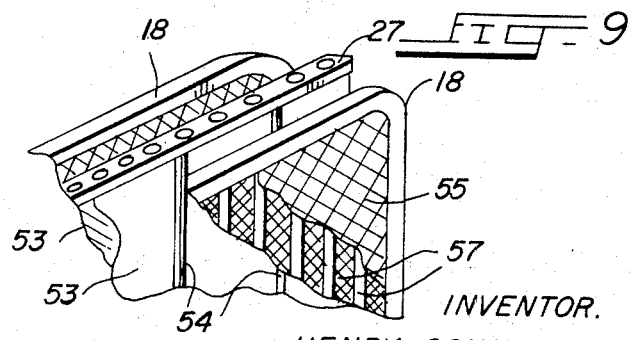

METHOD AND APPARATUS FOR CONTROLLING FILTER CAKE THICKNESS AND FOR COMPRESSING A FILTER CAKE

The present invention broadly relates to filters. More particularly, it relates to a new and improved apparatus for compressing a filter cake against a perforate element on which the cake is deposited.

The removal of entrained solids from a fluid, whether gaseous or liquid, is commonly achieved by flowing the fluid through a porous filtering medium which traps the solids on its surface while permitting the fluid to pass on through. Filters of this general type are usually of either the pressure type wherein the downstream side of the filter is maintained at atmospheric pressure and the upstream side is pressurized or of the vacuum type wherein the upstream side of the filter is maintained near atmospheric pressure and a vacuum is drawn on the downstream side. With either of these filter types, it is ordinarily desirable to remove the fluid trapped within the filter cake either before or after the cake is removed from the filter element, and the particular manner in which the fluid is removed is generally dictated by the economics involved. For example, where the fluid is a sugar solution, it is frequently removed from the cake by a leaching process wherein a leaching liquid is passed through the cake prior to separation of the cake from the filter element. In some cases where a substantially dry cake is required, a gas, such for example as air, is blown or sucked through the cake to partially dry it out before the removal thereof from the filter element. In other cases, the cake is compressed to squeeze out the fluid and to facilitate later handling of the cake.

In accordance with the present invention there if provided a new and improved apparatus for compressing the filter cake against the filter element on which it is deposited when the cake thickness reaches a predetermined value. In some applications of this invention, the compression of the filter cake against the filter element is automatic and eliminates the need for expensive leaching and blow-down operations and, in addition, it facilitates the removal of the filter cakes from the leaves by other means such as sluices and vibrators.

In the case of pressure filters in which a plurality of hollow, perforate elements are mounted in a pressure tank with the cavities in the filter elements connected to an outlet manifold, the normal operating procedure is for the fluid to be filtered to be pumped into the tank and thus through the filter elements until the filter cakes reach a predetermined thickness. As is well known in the art, cake build-up is not uniform from one filter element to another so that determination of the cake build-up on one filter element may not be representative of the build up on each of the other filter elements. Nevertheless, under normal operating conditions cake thickness detectors, timers and pressure sensors have provided generally satisfactory results. Of course, it has not been possible to operate such filters at the maximum theoretical efficiencies because of the allowances which have had to be made both in design an in operation for possible excessive cake build-up and consequent damage to the filter elements.

The present invention provides a hydraulically balanced system for independently terminating the cake build-up on each filter surface when the thickness of the particular cake on each filter surface reaches a predetermined value. As a result, the entire volume of the filter tank may be used to maximum advantage, and the possibility of damage to the filter elements is eliminated without resorting to excessive spacing between filter elements. Moreover, the present invention obviates the need for cake thickness detectors and simplifies the operation of the filter and the controls therefor while automatically responding to variations in flow rate and in the concentration of entrained solids.

Briefly, the above and further advantages may be achieved in accordance with the present invention by mounting a sheet or membrane of substantially impervious material on the upstream side, in substantially parallel, spaced apart relationship with the perforate surface of a filter element positioned across the path of flow of a fluid to be filtered. The spacing between the filter element and the sheet determines the thickness to which a filter cake can build up. When the cake reaches the sheet, fluid flow through the cake is substantially terminated and the pressure at the interface of the cake and the sheet falls below the upstream or tank pressure. Consequently, the pressure differential across the sheet forces the sheet toward the filter element thereby compressing the filter cake. In a preferred embodiment of this invention, the sheet is formed of an elastomeric material such as rubber so that the sheet stretches as it moves toward the filter element and returns to its unstretched condition when the tank pressure is reduced. The sheet need not, however, be stretchable or even flexible but may be mounted by hinged or other means permitting it to be moved against the filter cake by pressure differential developed thereacross.

Further objects and advantages and a better understanding of the present invention may be had from the following detailed description taken in conjunction with the accompanying drawings, wherein:

FIG. 1 is an elevational view, partly in section, of a pressure filter embodying the present invention;

FIG. 2 is a sectional view, taken along the line 2—2 of FIG. 1;

FIG. 3 is an enlarged, fragmentary view, partly in section, of a portion of the filter of FIG. 1 showing one embodiment of the present invention in operation;

FIG. 4 is a fragmentary view of the rear face of a cake compressor membrane embodying another feature of the present invention;

FIG. 5 is a top, sectional view showing a pair of the membranes of FIG. 4 mounted for operation;

FIG. 6 is a fragmentary view of an apertured cake compressor membrane embodying another aspect of the present invention;

FIG. 7 is a sectional view showing the membrane of FIG. 6 in operation;

FIG. 8 is a fragmentary view of another cake compressor membrane embodying still another aspect of the present invention; and FIG. 9 is a fragmentary, isometric view of another cake compressor membrane construction mounted between a pair of pressure filter leaves 18.

Referring now to the drawings and more particularly to FIG. 1 thereof, there is shown a horizontal type multiple pressure leaf filter, generally indicated by the numeral 10, which includes a horizontally extending tank 11 supported on a plurality of uprights 12. The filter tank 11, which is pressurizable, is permanently closed at one end 14, and an end cover 15 is removably secured to the opposite end of the tank by means of a plurality of spaced apart and cooperably mounted clamps 16.

The filter unit 10 is a pressure filter of the multiple leaf type employing a plurality of vertically disposed, hollow filter leaves 18 mounted in spaced apart parallel relationship on an outlet manifold 19 which extends along the bottom of the tank 11. The leaves 18 may be conventional in construction with the cavities in the leaves 18 communicating by way of tubular connectors 20 to the manifold 19. As is well known in the art, the opposite faces of the filter leaves 18 are perforated so that the fluid being filtered flows into cavities in the leaves through the perforated faces and thence through the connectors 20 into the manifold 19 from which it exits the filter. In the particular filter 10, a rigid bar 22 extends along the top center of the filter tank 11 and the filter leaves 18 are rigidly connected thereto by means of nut and bolt arrangements 23. The bar 22 is connected through a suitable seal in the cover 15 to a vibratory impactor device 24 which is mounted outside of the filter tank on the cover 15. As is known in the art, operation of the impactor 24 causes the bar 22 and the filter leaves 18 to vibrate as a unit to dislodge the filter cakes deposited on the faces of the filter leaves 18. While the present invention is described in connection with a pressure leaf filter using a vibrator for removing filter cake from the leaves, the invention is not so limited and finds application, for example, in pressure filters using sluicing mechanisms as well as in vacuum type filters.

In order to control the thickness of the filter cakes built up on each of the faces of the filter leaves 18, and in order to compress such cakes after they reach such predetermined thickness, there is provided in accordance with the present invention a pair of substantially impervious, flexible, resilient sheets or membranes 26 mounted in pairs between the filter leaves 18. The sheets 26, which are spaced very closely together to minimize the space which they occupy, each lie parallel to the leaves 18 and the surfaces of the sheets 26 are equidistant from the adjacent surfaces of the filter leaves. The surface area of the sheets 26 is greater than that of the filter elements 18 whereby the peripheral edges of the sheets 26 extend beyond the peripheral edges of the filter elements 18. The sheets 26 are preferably formed of an elastomeric material such as rubber and in this embodiment of the invention they are suspended in curtainlike fashion between the filter elements.

Considered in greater detail, the filter elements 18 are substantially square in cross section as are the sheets 26, and the upper edges of the sheets 26 in each pair are secured, as by cementing, to a channel member 27 which is provided with a plurality of apertures 28 (FIG. 2) for ensuring that the pressure between the sheets 26 is the same as the tank pressure. As shown, the support members 27 are rigidly secured to the vibrator bar 22 by nut and bolt arrangements 30 whereby the sheets 26 are vibrated during vibration of the filter elements 18. The lower end of the sheets 26 are similarly mounted in a channel member 31 which is also apertured throughout its length and secured by suitable means to the manifold 19. Where the filter leaves are circular, the sheets 26 are preferably circular and may be mounted in a ringlike support frame.

While it is desirable in some applications to vibrate the sheets 26 during the cake removal operation, this is not always the case, and in such other instances the sheets 26 are not attached to the vibrator bar but are supported by means independent thereof such, for example, as by a pair of bars (not shown) extending across the top of the tank.

In order to permit the introduction of fluid to the tank 11, the filter 10 is provided with a liquid inlet and drain line 33 at the bottom and fluid is supplied thereto through an inlet valve 34 or drained therefrom through an outlet and drain valve 35. In addition, an air inlet port 37 is provided on the side of the filter tank 11 to admit air or other gas under pressure to the tank 11.

During operation of the filter, the air line connecting to the port 37 is closed as is the drain valve 35 and the inlet valve 34 is open so that the liquid to be filtered is supplied to the tank 11 through the pipe 33. As the liquid flows through the perforate faces of the filter leaves 18 and/or a precoat layer deposited thereon, the entrained solids are trapped on the filter elements and develop into porous filter cakes 40. These filter cakes continue to build up until the outer surfaces thereof reach the adjacent ones of the sheets 26.

Referring to FIG. 3, there is shown a typical condition wherein the filter cake 40a had increased in thickness until it reached the sheet 26a and was then compressed between the sheet 26a and the adjacent leaf 18. It will be noted that the other filter cakes 40 have not yet reached their respective sheets 26, and therefore, the other sheets 26 (only one being shown) have not yet moved. When, however, these filter cakes do reach the adjacent sheet 26, the pressure at the interface between the cake and the sheet will decrease below tank pressure which will then force the sheet towards the surface of the adjacent filter element 18 to compress the cake. As shown in FIG. 3, the cake 40a has already been compressed by the sheet 26a which has stretched or expanded into the illustrated position. It will be apparent that flow through the filter cake 40a terminates at the time it reaches the sheet 26a. Consequently, the flow through the other filter elements may then increase whereby the filter cakes thereon build up more rapidly. As a result, during a normal operation using the filter 10, all of the filter cakes build up against their respective sheets 26 within a short time after the first cake is compressed. Once that all of the cakes have reached their respective sheets 26 and have been compressed, flow through the manifold is substantially terminated. This condition is sensed by means of a sensor 42 connected in the outlet line and which may be responsive either to rate of flow or to liquid level therein. Also, in the case of relatively noncompressible solids the pressure differential between the manifold and the filter chamber substantially increases. This can also be used to indicate when this condition occurs. In any case, the device signals that the filter cakes must be removed from the filter elements 18.

It will be noted that the filter cakes 40 are compressed while the tank pressure is at the normal operating value and during the normal operation of the filter.

Moreover, as the cakes are compressed by the sheets 26, the fluid retained therein is squeezed into the cavities in the filter elements 18 and adds to the normal flow through the filter.

In order to prevent the adjacent ones of the sheets 26 from pulling together whereby the pressure therebetween would be below tank pressure, there is provided in accordance with the embodiment of the invention shown in FIG. 4 a plurality of vertically disposed ribs 44 provided on the rear side of each of the cake compressing sheets. When mounted in the frames 27, the ribs 44 on one of the pair of sheets are interleaved with the ribs 44 on the other as shown in FIG. 5 thereby to ensure vertical passageways between the sheets. The ribs 44 may extend from the top of each sheet to a point about half-way down or they may extend throughout the full height of the sheet.

In FIG. 6, there is shown a portion of a cake compressing sheet 47 which may be used in place of the sheets 26. The sheet 47 is formed of an elastomeric material such as rubber and is provided with a plurality of spaced apertures 48 so that when a filter cake reaches such sheet there is a sufficient pressure differential across the sheet 47 to force it against the filter elements 18 in substantially the same manner as is an unperforated sheet. However, after the cake has been compressed using the perforated sheet 47, fluid may be passed through the cake while it is held in place by the sheet 47. For example, the tank 11 may be drained while air under pressure is supplied thereto to maintain the tank pressure substantially constant. The sheet 47 thus stays in contact with the cake to hold it in the compressed state while permitting the air to be blown through the cake via the apertures 48. As illustrated in FIG. 7, the air passing through each of the orifices 48 travels through a generally conical path. The advantage of blowing air through the sheet 47 is that the cake is held firmly in place by the sheet 47 during the blow-down operation thus eliminating the problem of cake cracking during the blow-down operation. As is well known in the art, this is a serious problem which results in the use of substantially greater amounts of air than would otherwise be necessary. In a similar manner, steam may be passed through the cakes while they are held in place by the sheets 47.

Referring to FIG. 8, there is shown a portion of another cake compressor sheet 50 which may be used in place of the sheets 26 in FIG. 1. Like the sheets 26, the sheet 50 is also formed of an elastomeric material and is provided with a plurality of slits 51 which are substantially closed when the sheet is in its unstretched condition as shown. However, after the filter cake is built up against the sheet 50 and the sheet has stretched to compress the cake against the filter element, the slits 51 are opened. Consequently, during a succeeding operation the openings provide less resistance to fluid flow therethrough to the adjacent filter cake than they offer to the liquid prior to their movement toward the leaves.

The present invention has been described above particularly in connection with a pressure type filter. However, its application is not so limited and as indicated above it may be used in a vacuum type filter. In such a case, the flexible sheets or cake compressor membranes operate in exactly the same manner as they do in a pressure filter in that the differential pressure developed thereacross when the filter cake contacts the sheet forces the sheet toward the filter element on which the cake is deposited thereby to compress the cake and force the fluid trapped therein through the perforations in the filter element from which it flows downstream of the filter.

For purposes of illustration, in FIG. 1 the spacing between the sheets is greatly exaggerated as is, of course, the thickness of the sheets. In a successful reduction to practice of the present invention, the sheets 26 had a thickness of about one-sixteenth inch and were spaced apart about one-fourth inch, while the spacing between the adjacent filter elements was about 5 inches. Consequently, the filter cake thickness was approximately 2½ inches prior to compression. The amount of compression depends primarily on the makeup of the filter cake. In the case of sewage, the cake was compressed from about 2½ inches in thickness to about 1 inch.

Referring to FIG. 9 there is shown a pair of sheets 53 mounted by an apertured channel member 27 between a pair of filter leaves 18 having perforated faces formed by fine screening 55 disposed over a fluted core 57. The sheets 53 have thin, vertical ribs 54 on the faces which engage the filter cake to provide shallow, narrow grooves in the faces of the cakes. Accordingly, when the sheets 53 are withdrawn, the cakes will separate from the leaves 18 and can be broken apart along these grooves in much the same way that glass is broken after being scored. The pre-crazing of the cake finds application when the cake is removed by vibrating the leaf as well as by sluicing.

While the present invention has been described in connection with particular embodiments thereof, it will be understood that many changes and modifications of this invention may be made by those skilled in the art without departing from the true spirit and the scope thereof. Accordingly, the appended claims are intended to cover all such changes and modifications as fall within the true spirit and scope of the present invention.

What is claimed is:

1. In filtering apparatus of the type wherein porous filter cakes build up on the perforate facial surfaces of a plurality of filter leaves mounted in face-to-face relationship in a filter chamber, the improvement comprising a plurality of sheets of material interposed in pairs between adjacent ones of said filter leaves with both faces of said sheets open to said chamber, and means mounting said sheets in such manner that when said cakes build up against said sheets and the pressures at the interfaces of said sheets and said cakes fall below chamber pressure, the pressure across said sheets automatically moves said sheets toward said leaves to compress said cakes directly against said leaves.

2. The invention set forth in claim 1 wherein said sheets of material are resilient.

3. The invention set forth in claim 1 wherein said sheets are formed of flexible material.

4. Filtering apparatus of the type including a plurality of pressure filter leaves mounted in spaced, parallel relationship in a pressure tank having a liquid inlet thereto with cavities in said leaves being connected to an outlet manifold, the combination of a plurality of substantially imperforate membranes mounted in parallel relationship with said leaves, one pair of said membranes being disposed between adjacent ones of said leaves, with both faces of said membranes being open to the interior of said tank.

5. The combination set forth in claim 4 wherein said membranes are formed of an expandable material.

6. The combination set forth in claim 5 wherein the facial areas of said membranes are greater than the facial areas of said leaves, and the edges of said membranes are disposed outwardly of the edges of said leaves.

7. Filtering apparatus as set forth in claim 4, comprising protrusions on the faces of said membranes.

8. Filtering apparatus according to claim 7 wherein said protrusions are provided on the opposing faces of the membranes in each said pair to provide passageways between said membranes to maintain tank pressure therebetween.

9. Filtering apparatus according to claim 4 wherein said membranes are perforated, whereby a fluid may be passed through the filter cakes while they are compressed between said membranes and said leaves.

10. A filter comprising, a tank having a liquid inlet to the chamber therein, a tubular outlet manifold disposed in said tank, a plurality of filter leaves mounted in said chamber in spaced apart mutually parallel relationship, said leaves each having a core and a pair of perforated surfaces mounted on opposite sides of said core and defining a cavity therebetween, means connecting said cavities to said outlet manifold, a plurality of planar members, means for mounting a plurality of said members in said tank between said filter leaves for mutually independent movement in directions toward and away from said perforate surfaces, one of said members being provided for each of said perforate surfaces with both faces of said members being open to said chamber.

11. A filter as set forth in claim 10 wherein said planar members are flexible, elastomeric sheets, and said means for mounting comprises a plurality of frame members mounted in said tank.

12. A filter as set forth in claim 11 wherein said sheets are mounted in pairs by said frame members.

13. A filter as set forth in claim 12 wherein said frame members are provided with apertures opening into the space between the pair of sheets mounted thereby.

14. A filter as set forth in claim 10 comprising a vibrator, and means connecting said vibrator to said planar members.

15. A filter as set forth in claim 14 comprising means connecting said vibrator to said filter leaves.

16. A filter as set forth in claim 14 wherein said planar members are elastomeric sheets which expand while moving toward said filter leaves.

17. A filter as set forth in claim 10 wherein said planar members are provided with a plurality of apertures.

18. A filter as set forth in claim 17 wherein said apertures are arranged in a predetermined pattern.

19. A method of compressing a filter cake on the surface of a perforate filter element mounted in a filter chamber, movably positioning a non-inflatable, substantially imperforate, resilient compression means on the upstream side of and in spaced apart relationship with a perforate filtering surface of said filter element, forcing a liquid containing entrained solids into said chamber and through said perforate surface to cause said solids to build up as a cake on said filter element until said cake engages said compression means, thereafter forcing liquid into said chamber to cause said compression means to move toward said perforate filtering surface to compress said cake between said compression means and said filter element, and relieving the pressure on the upstream side of said compression means to permit said compression means to move away from said filter element.

* * * * *